Nov. 8, 1955  H. H. BIDWELL  2,723,137
SHAFT MOUNTING
Filed July 8, 1953
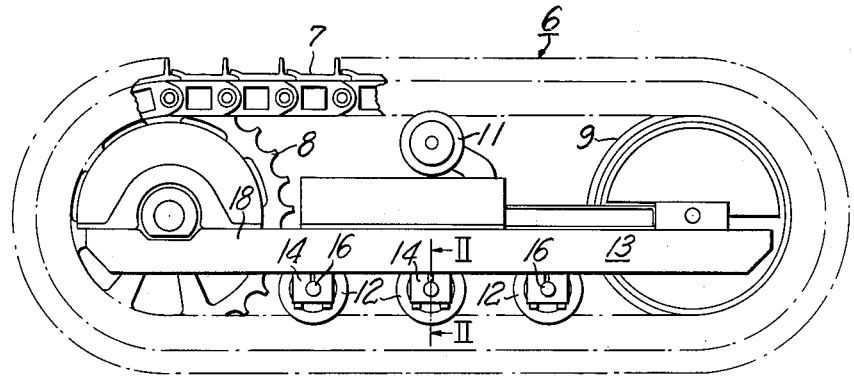
Fig. 1
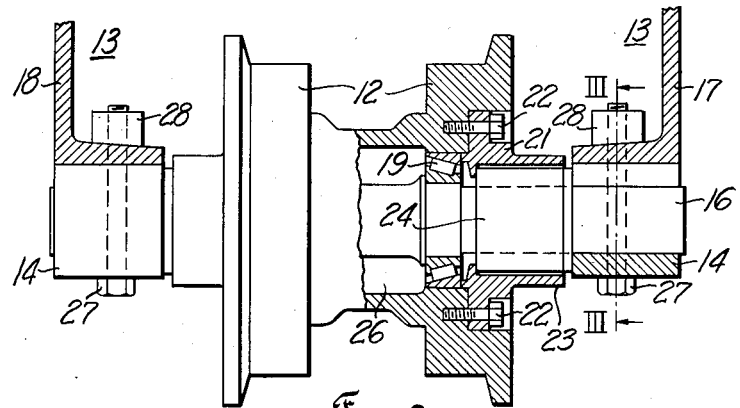
Fig. 2
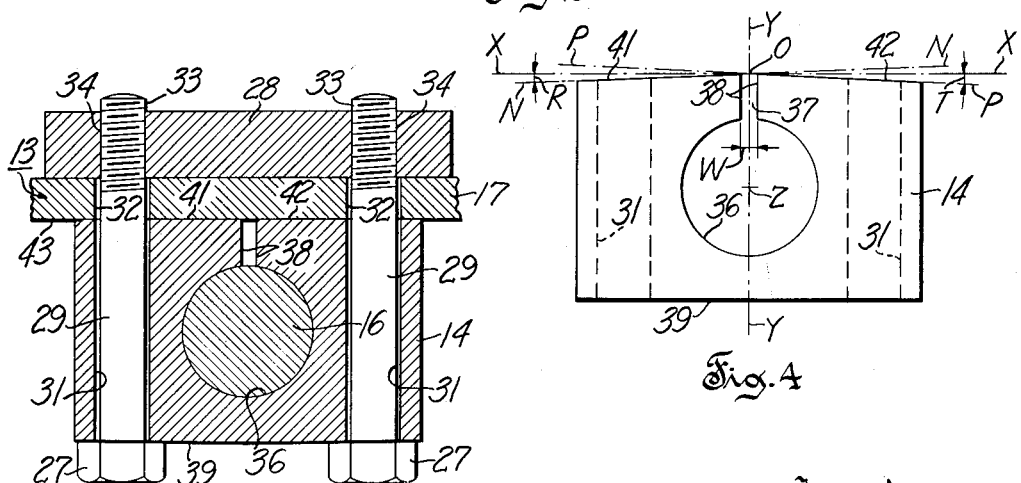
Fig. 3
Fig. 4
Inventor
Harry H. Bidwell
by Kimball S. Wyman
Attorney

United States Patent Office 2,723,137
Patented Nov. 8, 1955

2,723,137

SHAFT MOUNTING

Harry H. Bidwell, Springfield, Ill., assignor to Allis-Chalmers Manufacturing Company, Milwaukee, Wis.

Application July 8, 1953, Serial No. 366,659

4 Claims. (Cl. 287—23)

This invention relates to running gear for a crawler type tractor and more particularly to structure for mounting truck wheels to a track frame.

In the construction of crawler tractors, it is common practice to mount the truck wheels on shafts which are non-rotatably secured to the truck frame. Under the severe operating conditions to which crawler tractors are subjected it has been found difficult to provide a mounting for the truck wheel shafts which will not work loose and thereby permit the shafts to rotate relative to the truck frame. Unless repairs are made promptly after a truck wheel shaft has worked loose, rotation of the shaft in its mounting will result in excessive wear and ultimate breakdown of the tractor.

The principal object of this invention is to provide an improved shaft mounting structure that lends itself for use in mounting truck wheels of a crawler tractor and that will overcome the hereinabove outlined difficulties in a practical and entirely satisfactory manner.

Another object of this invention is to provide an improved bracket for nonrotatively mounting a shaft that is economical to build, easy to install and gives long, trouble free service.

These and other objects and advantages of this invention will be evident from the following description when read in connection with the accompanying drawings, in which:

Fig. 1 is a side view of a self-laying track unit for a crawler type tractor, which has truck wheel brackets incorporating the present invention;

Fig. 2 is an enlarged partial section along the line II—II of Fig. 1 showing the mounting of a truck wheel on a truck wheel shaft and a pair of truck wheel shaft brackets which are in turn mounted on a track frame;

Fig. 3 is an enlarged section along the line III—III in Fig. 2 showing the installed condition of a truck wheel shaft bracket; and Fig. 4 is an end elevation of the truck wheel shaft bracket shown in Fig. 3, the view of Fig. 4 showing the bracket in an unstressed, noninstalled condition.

Referring to Fig. 1, a self-laying track unit generally designated by the reference character 6 comprises an endless track belt 7, a track belt driving sprocket 8, a track idler 9, a track supporting roller 11 and three truck wheels 12. The truck wheels are each mounted on a track frame 13 as more clearly shown in Fig. 2.

Referring to Fig. 2, a pair of brackets 14 support a truck wheel shaft 16 and are securely attached to an inside channel 17 and an outside channel 18, respectively, of track frame 13 in a special manner more fully hereinafter described. The truck wheel 12 is rotatably mounted in a conventional manner on its truck wheel shaft 16 by a pair of tapered roller bearings only one of which is shown in Fig. 2 and designated by the reference character 19. The outer raceway of bearing 19 is prevented from moving axially outwardly by a bearing retainer 21 which is bolted to the truck wheel by stud bolts 22. Retainer 21 has a cylindrical portion 23 affording protection to an oil seal 24 of any suitable type. The seal 24 is installed between a radially extending surface of the rotating bearing retainer 21 and the stationary shaft 16 so as to prevent escape of lubricant from a lubricant containing cavity 26 of truck wheel 12.

Referring to Fig. 3, the truck wheel bracket 14 is attached to channel 17 by clamping means comprising a pair of cap screws 27 and a tapped block 28. The cap screws 27 each have a shank portion 29 which extends through a hole 31 in bracket 14 and through a hole 32 in the channel 17. The diameters of holes 31 and 32 are each larger than the diameter of cap screw 27 which extends through them. Each of the cap screws has a threaded end portion 33 which engages a complementary threaded bore 34 in block 28. Referring to Fig. 2, the bottom surface of block 28 is tapered so as to be complementary to the tapered flange of channel 17. A cylindrical end portion of shaft 16 extends into a shaft receiving bore or aperture 36 of bracket 14, and provisions for securing the shaft 16 against rotation within the bore 36 are made as follows:

Referring to Fig. 4, the bracket 14 is made of metal having suitable resiliency to permit elastic deformation of the bracket, and in Fig. 4 the bracket is shown in an unstressed condition. The internal cylindrical surface of the bracket which defines the shaft receiving aperture 36 is interrupted by a circumferential gap 37 which has a circumferential width W between a pair of circumferentially spaced confronting walls 38 formed on end portions of the bracket. The gap 37 extends the axial length of the aperture 36 in parallel relation to the axis Z of the aperture 36 and also extends radially from the aperture 36, vertically splitting the bracket 14. The walls 38 of gap 37 are parallel to a vertical axis Y—Y which is perpendicular to the bottom side 39 of the bracket. On the upper side of the bracket, two plane mounting surfaces 41 and 42 are formed. These mounting surfaces 41 and 42 lie in relatively inclined planes N—N and P—P, respectively, which are parallel to the axis Z of aperture 36. Planes N—N and P—P intersect on line O which is also the line of intersection of vertical plane Y—Y and a horizontal plane X—X. Horizontal plane X—X is parallel to the bottom side 39 of the bracket and vertical plane Y—Y passes through the axis Z of aperture 36. Mounting surface 41 lies in that portion of plane N—N which is below horizontal plane X—X. Plane N—N and horizontal plane X—X form an acute angle R. Mounting surface 42 lies in that portion of plane P—P which is below horizontal plane X—X. Planes P—P and X—X form an acute angle T which is equal to the acute angle R.

Referring again to Fig. 3, the mounting surfaces 41 and 42 are held in flat engagement with the flat surface 43 formed on the underside of the supporting channel 17 by the clamping bolts 29. The thickness of the bracket between the aperture 36 and the bottom wall 39 is small enough to allow the bracket 14 which, as stated, is made of metallic resilient material, preferably steel, to be resiliently flexed. In the installed, resiliently flexed condition of the bracket, a force is transmitted to each of the cap screws 27 in a direction toward the head of each of the cap screws and the bracket acts like a lock washer in resisting turning of the cap screws in the threaded holes of block 28. In the installed, resiliently flexed condition of the bracket as shown in Fig. 3, the aperture 36 is radially contracted to a size smaller than its size in the unstressed, noninstalled condition as shown in Fig. 4. Also, when the aperture is in a radially contracted condition, as shown in Fig. 3, the walls 38 on end portions of the bracket are spaced from each other by a distance less than width W shown in Fig. 4.

Referring to Fig. 4, the mounting surfaces 41 and 42 lie in relatively diverging planes which may be brought into a common plane when the bracket is radially contracted to a shaft locking condition, as shown in Fig. 3, in which the common plane is coincident with surface 43 of channel 17 and parallel to axis Z of the shaft receiving aperture. The magnitude of angles R and T, which may be made equal as they are shown to be in Fig. 4, is determined by experiment and depends generally on the size of the shaft, the torque load to which the shaft is subjected and the relative dimensions of the bracket, support and clamping bolts. As shown in Fig. 4, the planes N—N and P—P intersect each other on a line O which is spaced from the axis Z of aperture 36 a distance greater than the shortest distance of either plane N—N or P—P from the axis Z.

In the unstressed noninstalled condition of the bracket 14, as shown in Fig. 4, the diameter of the contractable aperture 36 is slightly larger than the diameter of the mating end portion of shaft 16. When the bracket is drawn into flat engagement with the support or channel 17 by screwing the cap screws 27 into the tapped holes 34 of block 28, the aperture contracts and grips the shaft 16 with sufficient radial compressive force to secure the shaft 16 against turning under any torque to which it may become subjected in operation of the tractor.

The bracket of this invention is relatively simple to manufacture and can readily be made of a relatively inexpensive metallic material such as steel or an aluminum alloy. In use, the bracket has been found to give long, trouble free service under severe working conditions. In order to secure the bracket to its support cheaply and efficiently, a pair of commercially available cap screws and a block with tapped holes may be employed. By using this type of connection, the bracket may be readily installed or removed with standard mechanic's tools.

Although the invention is shown embodied in a truck wheel installation, it should be understood that it is not intended to limit the invention to that type of installation, and that the invention may be embodied in such other forms and modifications as are embraced by the scope of the appended claims.

It is claimed and desired to secure by Letters Patent:

1. For use in a shaft mounting, a shaft embracing bracket structure presenting a shaft receiving aperture, a gap at one side of said bracket structure permitting radial contraction of said bracket structure from a shaft receiving to a shaft locking condition, and plane mounting surfaces formed on said one side of said bracket structure at opposite sides of said gap and in parallel relation to the axis of said aperture, said plane mounting surfaces diverging relative to each other and inclining outwardly from said gap and toward the side of said bracket structure opposite said one side.

2. For use in a shaft mounting, a resiliently contractable shaft embracing bracket structure having a shaft receiving aperture, relatively opposed end portions in circumferentially spaced confronting relation to each other so as to define a radial gap in one side of said bracket structure, and a pair of plane mounting surfaces formed on said one side of said bracket structure parallel to the axis of said shaft receiving aperture and at opposite sides, respectively, of said gap, said plane mounting surfaces diverging relative to each other and inclining outwardly from said gap and toward the side of said bracket structure opposite said one side, when said bracket structure is in a radially nonstressed condition.

3. In combination a support; a shaft embracing bracket structure having a shaft receiving aperture, relatively opposed end portions defining a radial gap in one side of said bracket structure permitting radial contraction of said aperture from a shaft receiving to a shaft locking condition, and a pair of relatively diverging plane mounting surfaces formed on said one side of said bracket structure at opposite sides, respectively, of said gap and in parallel relation to the axis of said aperture, said plane mounting surfaces inclining outwardly from said gap and toward the side of said bracket structure opposite said one side; and clamping means for mounting said bracket structure on said support operable to contract said aperture from a shaft receiving to a shaft locking condition and simultaneously urge said plane mounting surfaces into flat engagement with said support.

4. In a shaft mounting, the combination of a support; a shaft bracket having a shaft receiving aperture and a radial gap permitting radial contraction of said aperture from a shaft receiving to a shaft locking condition, a pair of mounting surfaces formed on one side of said bracket on portions of said bracket extending transversely of and at opposite sides of said gap, said mounting surfaces inclining outwardly from said gap and toward the side of said bracket opposite said one side, when said aperture is in said shaft receiving condition, and said plane mounting surfaces being adapted to lie in coplanar relation with a mounting surface of said support in said locking condition of said aperture; and clamping means for mounting said bracket on said support operable to exert a flexing force on said bracket to contract said aperture from a shaft receiving to a shaft locking condition.

References Cited in the file of this patent

UNITED STATES PATENTS

| | | |
|---|---|---|
| 643,169 | Swan | Feb. 13, 1900 |
| 757,195 | Huff | Apr. 12, 1904 |
| 1,769,573 | Gwinn | July 1, 1930 |